May 13, 1924.
E. J. VON HENKE
WELDING APPARATUS
Filed Oct. 20, 1921
1,493,656
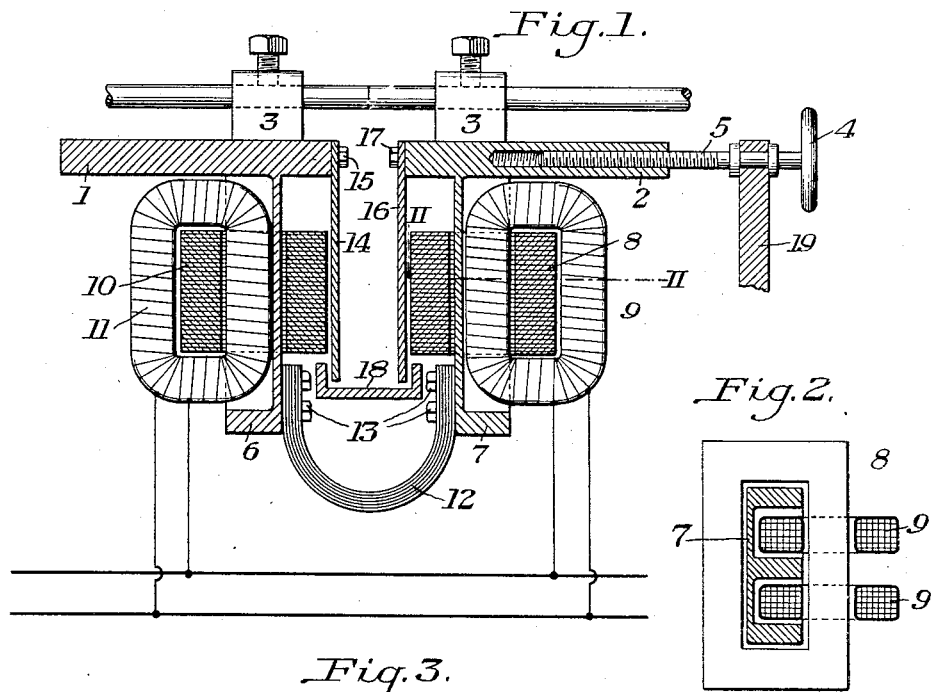
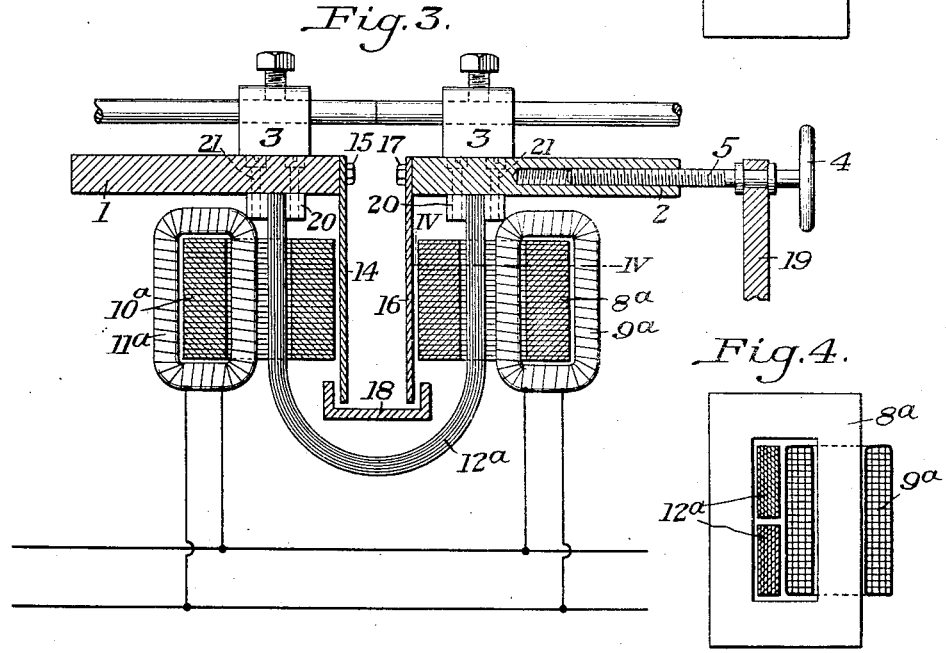
INVENTOR
Edmund J. Von Henke
by Byrnes, Stebbins, Burgess & Parmelee
his Attorneys Patented May 13, 1924.

1,493,656

UNITED STATES PATENT OFFICE.

EDMUND J. von HENKE, OF CHICAGO, ILLINOIS.

WELDING APPARATUS.

Application filed October 20, 1921. Serial No. 509,106.

*To all whom it may concern:*

Be it known that I, EDMUND J. VON HENKE, a citizen of the United States, residing at Chicago, in the county of Cook and State of Illinois, have invented a new and useful Improvement in Welding Apparatus, of which the following is a full, clear, and exact description.

My invention relates to welding apparatus and particularly to such apparatus for butt welding.

An object of my invention is such a device which is simple in construction and efficient in operation.

A further object of my invention is such a device wherein a single welding circuit is used and in which a cumulative effect is produced by two or more transformers, with individual primary coils but with the common secondary consisting of the above welding circuit.

A further object of my invention is such an arrangement of these transformers wherein the particles called "flash" thrown off by the welding are permitted to fall downwardly without encountering any part of the transformers.

A further object of my invention is such an arrangement of circuits wherein the welding circuit is of minimum resistance resulting in an increased efficiency of the machine; also by having a number of transformers, each of which has to deliver but a part of the secondary voltage a considerable saving is accomplished in the magnetic material used for core by virtue of the decreased length of the mean magnetic circuit.

My invention will be better understood by reference to the accompanying drawings which represent more or less diagrammatically machine embodying my invention and in which:

Figure 1 shows a cross sectional view of an apparatus embodying my invention;

Figure 2 shows a section on line II—II of Figure 1;

Figure 3 shows a sectional view of a machine embodying a modification of my invention; and Figure 4 shows a section on line IV—IV of Figure 3.

The machine comprises platens 1 and 2, each of which is provided with a work holder 3. The platen 2 is movable to and from the platen 1 by means of a hand wheel 4 attached to a screw 5. The screw 5 passes through a support 19 which prevents the longitudinal movement of the screw. Any other suitable means may be used for producing the compression well known by those familiar with the art.

The platens 1 and 2 are provided with an extension 6 and 7, respectively. The core 8 of the transformer surrounds the extension 7 and a coil 9 surrounds one leg of the transformer core 8. A similar core 10 surrounds the extension 6 and a coil 11 surrounds one leg of the core 10. The coils 9 and 11 can be connected either in multiple or series to a source of supply of alternating current. The extensions 6 and 7 are connected together by a flexible electrical conductor 12 usually made of copper ribbons. The ends of the conductor 12 are bolted to the extensions 6 and 7 by bolts 13. The extensions 6 and 7 preferably have a cross section as shown in Figure 2. These two extensions and the arrangement of the coils thereon are identical.

Extending downwardly from the platen 1 is an apron 14 attached to the platen by bolts 15. Extending downwardly from the platen 2 is an apron 16 attached to the platen by screws 17. These aprons terminate in a channel-form receptacle 18. The aprons 14 and 16, also channel 18, may be made of any suitable fire-proof material and have the function of protecting the transformers by preventing the particles which are thrown off from the work during the welding from coming into contact with the transformers.

The particles thrown off by the welding fall downwardly into the channel 18.

The device illustrated more or less diagrammatically in Figure 3 is quite similar in most respects to the device as illustrated in Figure 1. It differs from the structure of Figure 1, however, in that the flexible conductor 12ª is provided with lugs 20 and the ends of the flexible conductors 12ª are attached respectively to the platens 1 and 2 by means of bolts 21 or other suitable means. Furthermore, the transformer coils 9ª and 11ª surround their respective cores 8ª and 10ª in the manner shown in Figure 4. As in the arrangement of Figure 1 the transformer coils are fed from any suitable source of alternating current.

The operation of my device is as follows:—

The work is clamped in the holders 3 so that there is a slight distance between the ends of the work-pieces. The pressure device is then made to move the platen 2 to bring the work-pieces together. The current is turned on the transformers and an induced secondary current in the welding circuit will pass through the extensions 6, work-pieces, extensions 7, conductor 12 or 12ª, thus producing a welding temperature at the ends of the work-pieces. The weld is then completed by further application of pressure in the ordinary way. During this operation there is ordinarily a considerable amount of scale and other particles known as "flash" thrown off from the welding joint. Such material in my machine passes downwardly between the aprons 14 and 16 into the channel 18 and does not come into contact with any other portion of the machine. The transformer connections may be modified to suit conditions. It sometimes becomes necessary to operate them from a polyphase circuit. This can be done by connecting the two transformers in open V on either a three-phase or a two-phase circuit, thus instead of the whole load coming off of one phase and badly unbalancing the polyphase system the load will be distributed among the various phases.

My invention has many other advantages resulting from the construction shown and described.

While I have shown and described two embodiments of my invention in detail, I desire it to be understood that I am not to be limited to the arrangement shown and described, as many modifications may be made in the details without departing from the spirit of my invention.

I claim:

1. In a device of the character described, the combination of platens, means for clamping the work on each platen, means connecting such means together to form a single welding circuit and two transformers acting to produce a cumulative voltage in the welding circuit.

2. In a device of the character described, the combination of means for holding the work to be welded, a welding circuit including said means, and a plurality of transformers connected so that their voltage acts cumulatively upon the said welding circuit for heating the work to welding temperature.

3. In a device of the character described, the combination of means for holding the work to be welded, a welding circuit including said means a plurality of transformers connected so that their voltage acts cumulatively upon the said welding circuit for heating the work to welding temperature, and means for producing pressure at the welding point.

4. In a device of the character described, the combination of platens and means for supporting the work to be welded, means for moving said platens relatively to each other, means electrically connecting said platens together forming a single secondary circuit and two transformer primaries operating upon said means for producing a cumulative voltage in said secondary circuit.

5. In a device of the character described, the combination of two platens, means on each platen for holding the work to be welded, said means being connected to form a secondary circuit, an extension underneath each platen, and removed from a vertical line through the welding point, a transformer coil operating upon each extension, and means between said transformer and a vertical line passing through the welding point for protecting the transformer from the flash and molten particles resulting from welding.

6. In a device of the character described, the combination of two platens, means on each platen for holding the work to be welded, means extending below each platen, a transformer primary acting on said means, an electrical conductor connecting said extending means whereby a single secondary circuit is provided including said conductor, extensions and the article to be welded.

In testimony whereof I have hereunto set my hand.

EDMUND J. von HENKE.